May 17, 1966         J. R. URSCHEL ETAL         3,251,389
         MACHINE FOR AND METHOD OF COMMINUTING A PRODUCT
Filed Sept. 17, 1964                              4 Sheets-Sheet 1

INVENTORS
JOE R. URSCHEL
BY   EDGAR R. SANDERS

Charles S. Penfold
ATTORNEY

INVENTORS
JOE R. URSCHEL
EDGAR R. SANDERS
BY
Charles S. Penfold
ATTORNEY

May 17, 1966    J. R. URSCHEL ETAL    3,251,389
MACHINE FOR AND METHOD OF COMMINUTING A PRODUCT
Filed Sept. 17, 1964    4 Sheets-Sheet 3

INVENTORS
JOE R. URSCHEL
EDGAR R. SANDERS
BY
Charles S. Penfold
ATTORNEY

3,251,389
MACHINE FOR AND METHOD OF COMMINUTING A PRODUCT
Joe R. Urschel, 202 Michigan Ave., and Edgar R. Sanders, 708 Evans Ave., both of Valparaiso, Ind.
Filed Sept. 17, 1964, Ser. No. 397,137
25 Claims. (Cl. 146—239)

The subject application is a continuation-in-part of our copending application Serial No. 167,288, filed January 19, 1962, now abandoned.

The subject invention relates generally to means for conditioning a product and more particularly is directed to a machine and/or method whereby different products can be disintegrated, shaved or sheared into small pieces or flakes of various sizes.

Several types of centrifugal mills have been designed in the past. The hammer mill, for example, is a centrifugal mill in which swinging hammers beat and crush the product to be reduced until it is sufficiently fine to escape through holes in a cylindrical body of the mill. Some of these hammer mills do not employ swinging hammers, but the hammers are secured rigidly to an impeller. In both these types of hammer mills, at least a portion of the product is forced to slide around over the inner cylindrical surface of the mill. Centrifugal force produces great pressure of the product against this cylindrical surface and this coupled with movement of the product over the surface produces much friction which disadvantageously results in the generation of heat in the product.

It is also recognized that a number of different types of centrifugal mills have been made which tend to reduce the size of a product by a cutting action. However, insofar as is known, in none of these of these has there been any provision to positively regulate the size of the particles being cut from the product.

With the foregoing in mind, one of the primary objects of the subject invention is to provide a machine which overcomes the disadvantages inherent in the hammer and cutting mills, above referred to, and afford a novel setup whereby the size of various products can be efficiently reduced by a cutting-shaving principle with a minimum of heat producing friction.

A particular object of the invention is to provide a cutter assembly which includes a pair of rings and a plurality of circumferentially spaced axially extending knives which are secured between the rings to form an annulus or a generally cylindrical structure for receiving an impeller whereby a product introduced thereto will be rotated and forcibly directed against the knives for cutting and discharge outwardly therebetween.

A significant object of the invention is to provide a cutter assembly of the character above referred to in which the knives are preferably planar and rectangular in cross-section and arranged uniformly substantially in the shape or form of a cylinder, so that their inner narrow rectangular edges or surfaces facing the center of the assembly are disposed substantially tangent to the inside of the cylinder and that their larger leading rectangular side surfaces are disposed substantially radially. More specifically, the inner narrow surfaces of the knives assist in guiding the product and the leading edges or arrises formed by the inner and side surfaces of the knives constitute the cutting or shaving edges.

Also, an important object of the invention is to provide a unique setup whereby the knives may be readily installed or mounted in any one of a plurality of positions so that any of four corner cutting edges or arrises provided on each knife can be utilized for shaving the product.

A further object of the invention is to provide the rings with individual seats or abutments which serve to uniformly space the knives circumferentially about the longitudinal axis or center of the assembly.

A specific object of the invention is to provide annular means, preferably of a resiliently flexible character, for engaging and imparting an axial thrust against the knives whereby to assist in locating and stabilizing their positions.

Another object of the invention is to provide annular means, preferably surrounding the upper and lower extremities of the knives in a manner whereby to uniformly locate the inner cutting edges of the knives a predetermined distance from the center of the assembly.

A still further object of the invention is to provide an impeller which is designed and constructed for operative use with the cutter assembly in a unique manner and includes a plurality of circumferentially spaced vanes or blades having relatively large radially extending planar surfaces for imparting rotation to the product for delivery by centrifugal force to the knives.

Another object of the invention is to provide means whereby to substantially prevent packing of the product between the impeller and the cutter assembly.

An important object of the invention, particularly as to the additional disclosure, resides in providing a machine or mill for reducing the size of any material which can be discharged from the mill as a fluid.

A further object of the invention is to provide a machine which comprises a cylinder or annulus composed of a multiplicity of circumferentially spaced blocks or abutments and an impeller which is rotated within the confines of the cylinder at a very high rate of speed.

More particularly, an objective of the invention is to provide a machine of the character referred to in the two preceeding paragraphs in which the blocks or abutments are preferably rectangular in cross-section and have inner planar impact surfaces which are disposed tangent to the cylinder at their trailing edges.

A significant object of the invention is to provide a machine comprising a cylinder or annulus and an impeller which has blades provided with tips or extremities which pass over the impact surfaces of the blades in such a manner that the product is crushed or disintegrated as distinguished from being cut. Otherwise expressed, as the tips of the blades pass over the impact surfaces, the clearance between the tips of the blades and the inner surfaces decrease or diminish to produce the crushing or disintegrating action on the product. As the product passes over the impact surface of each block, it serves to reactively push or force the product inwardly and then release it as it causes it to pass over the trailing edge of the block for outward movement or discharge through centrifugal force. This inward and outward movement or motion of the product takes place at several thousand actions per second which causes destruction of the product through impact. Solid product with the fluid flows over the inner surface of the cylinder at many thousands of feet per minute and as the solid product and fluid escape from the cylinder it must turn at a right angle at high speeds to flow through the spaces between the blocks. This causes a tremendous ripping action on the solid portion of the product. The space between the blocks can be controlled so as to permit the escape of particles only after they have been reduced to a certain size.

Additional objects and advantages of the invention will become apparent after the description hereinafter set forth is considered in conjunction with the drawings annexed hereto.

Figure 1:
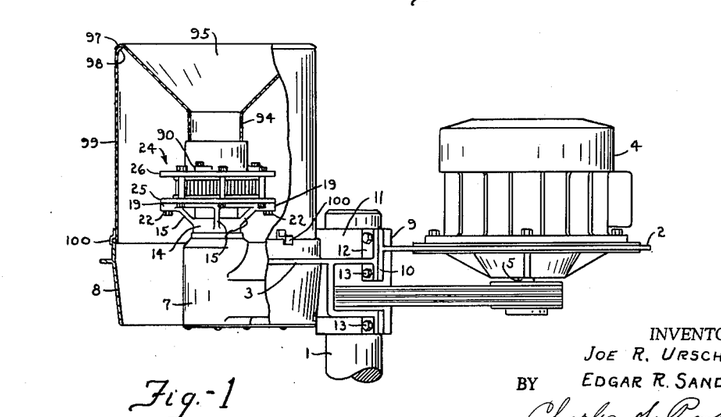
FIGURE 1 is a partial elevational view of the machine, with portions broken away to illustrate certain details of construction.
Figure 2:
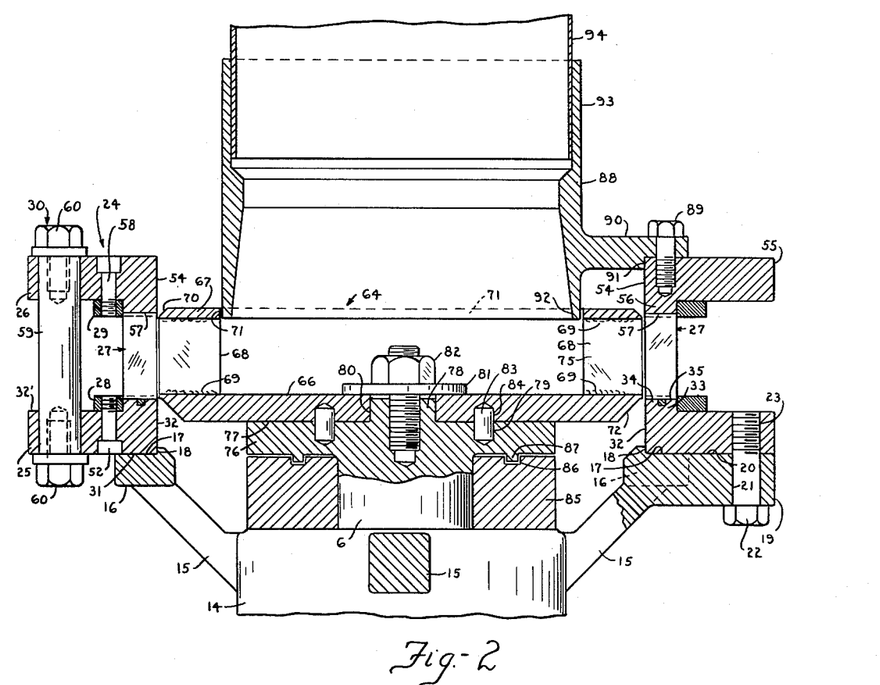
FIGURE 2 is a partial vertical section illustrating the operative relationship of the cutter assembly and impeller and mode of mounting the same.

Referring first to FIGURES 1 and 2 of the drawing, there is shown a post or pillar 1 to which supports 2 and 3 are connected. The pillar is carried by a base, not shown, to facilitate placement of the pillar and machine carried thereby. A motor 4 is mounted on the support 2 and provided with a vertical drive shaft 5 which is preferably operatively connected to a vertical driven shaft 6 through a plurality of V-bolts and pulleys. The driven shaft is journalled in a bearing structure of the support 3, the latter also including a housing 7 within which pulleys on the driven shaft and portions of the belts are concealed for protection against downward flow of a shaved product through a tapered cylindrical guide 8 disposed about the housing.

The supports may be designed and constructed as desired and as shown the support 2 is provided with a semicylindrical portion 9 receiving the pillar and a pair of flanges 10. The support 3 is similarly provided with a receiving portion 11 and a pair of flanges 12. It will be observed that only one of each of the pairs of flanges 10 and 12 are shown in FIGURE 1. Bolts 13 may be extended through holes in the flanges for detachably clamping the supports in any desired rotative and elevated position on the pillar for stability and convenience in operation.

The support 3 is provided with a spider-like mounting having a tubular portion 14 through which the driven shaft 6 extends and a plurality of inclined arms 15, which are joined by an annular rest 16 having a horizontal planar seat 17 and an upstanding annular abutment 18. The rest is provided with radially extending lugs 19, aligned with the arms 15, and have upper planar surfaces 20 constituting lateral continuations of the seat. These lugs are provided with openings 21 through which screws 22 may extend upwardly into threaded engagement with threaded apertures 23 provided in a lower ring of a cutter assembly or head generally designated 24 for detachably and firmly anchoring the same to the rest 16 of the supporting structure.

The cutter assembly may be designed and constructed in various ways but as particularly illustrated in FIGURES 2 through 8, it comprises a lower ring 25, an upper ring 26, axially extending knives generally designated 27, abutment means 28 and 29, and fastening means generally designated 30 for detachably securing the rings and knives in assembled relation.

More specifically, the lower ring 25 is preferably in the form of an annular plate having a bottom planar surface 31 engaging the seat 17 of the rest 16 and an inner cylindrical surface 32 engaging the abutment 18 for centering the cutter assembly on the rest. The surface 32 defines an opening of a predetermined diameter and the ring or plate 25 has an outer cylindrical surface or periphery 32'. The lower plate or ring is preferably provided with a raised annular portion 33 which is divided into inner and outer annular ridges 34 and 35 by an annular groove or recess 36. The groove 36 is preferably defined by a bottom wall or surface 37 and parallel side surfaces 38. The ridge 34 is disposed in concentric spaced relation within the outer ridge 35. The upper surface of the ridges are preferably interrupted by substantially radially extending notches 39, with the notches in the outer ridge being aligned with those in the inner ridge. The notches are equally spaced apart circumferentially and each is defined by a bottom surface 40 and a pair of parallel side surfaces 41 to form receiving means or seats for receiving the lower ends of the knives 27.

The knives 27 are preferably elongate and rectangular in cross-section to provide a pair of corresponding parallel relatively large or wide rectangular planar surfaces or areas 42 and 43 and a pair of corresponding parallel relatively narrow rectangular surfaces or areas 44 and 45. The surfaces 42 and 43 are disposed substantially perpendicular to the surfaces 44 and 45 and define in conjunction therewith four corresponding corner cutting edges or arrises 46, 47, 48 and 49. The size of the notches is such that either extremity or end of each knife can be readily inserted and snugly received in a notch and so that either of their narrow surfaces 44 and 45 can be disposed adjacent the inner cylindrical surface 32 of the lower ring. It will also be evident that the width of the knives substantially corresponds to the radial dimension of the raised annular portion 33 so that the knives do not project inwardly from the surface 32 or outwardly from an outer cylindrical surface 50 of the portion 33.

Figures 3, 4, 5, 6, 7, 8:
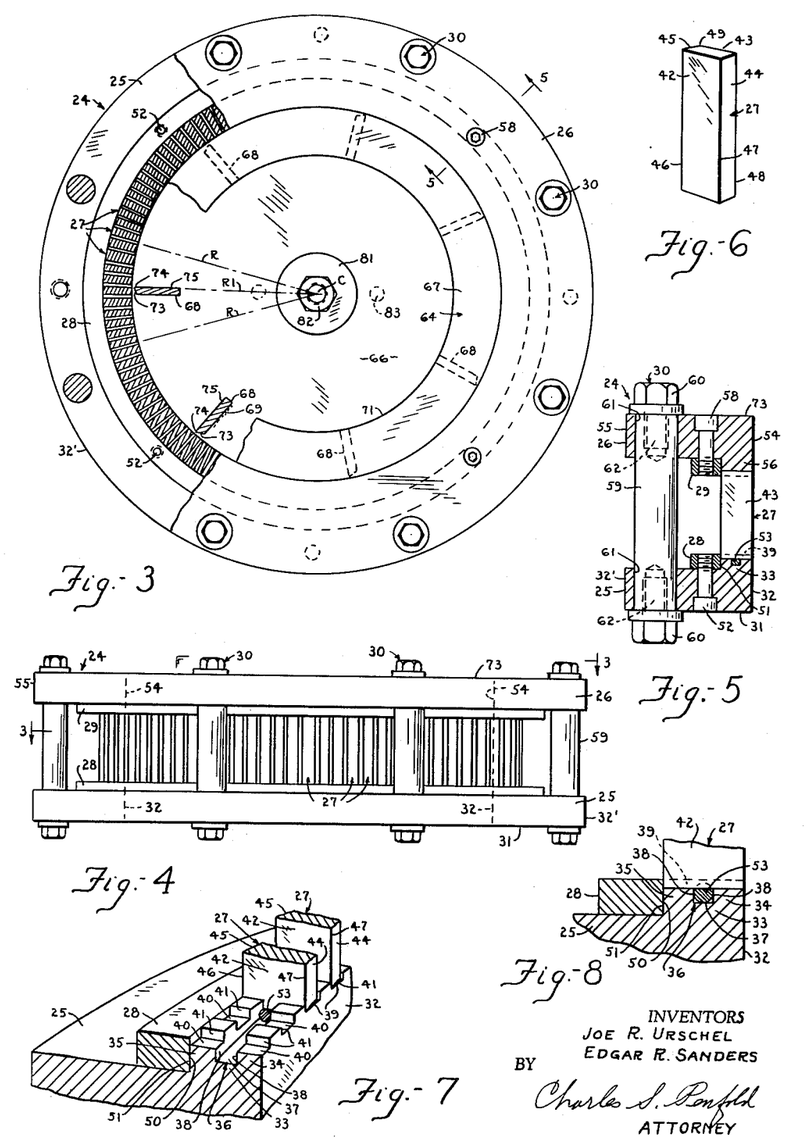
FIGURE 3 is a horizontal section taken substantially on line 3—3 of FIGURE 4 showing structural details of the cutter assembly and impeller.
FIGURE 4 is a side elevational view of the cutter assembly.
FIGURE 5 is a partial vertical section, taken substantially on line 5—5 of FIGURE 3, illustrating details of the means employed for maintaining the components of the cutter assembly assembled.
FIGURE 6 is a pictorial view of one of the knives.
FIGURE 7 is a partial plan view showing details of construction with respect to mounting the knives in the rings of the cutter assembly and the limiting or locating means for the knives.
FIGURE 8 is a partial vertical section showing the mode of mounting the annular means for applying an axial thrust to the knives.

The abutment means 28, above referred to, is preferably in the form of an annular ring, substantially rectangular in cross-section. This ring surrounds the raised portion 33 and has an inner cylindrical surface 51 bearing against the outer cylindrical surface 50 of said portion. The abutment means 28 is preferably of a thickness or height substantially equal to the height of the annular portion 33 and constitutes a backing for limiting outward movement of the knives as well as a means for locating either of the inner narrow surfaces 44 or 45 of the knives in a generally cylindrical relation concentric to the longitudinal axis or center C of the cutter assembly as shown in FIGURE 3.

Any means suitable for the purpose may be employed to secure the abutment means 28 in place but as shown a plurality of circumferentially spaced screws 52 extend upwardly through apertures in the ring 25 and into threaded holes provided in the abutment means. It will be observed that the screws have heads which are countersunk and bear against the seat 17 as depicted in FIGURE 2. With this arrangement the screws are locked against displacement or rendered non-accessible for turning.

Resiliently flexible means 53, preferably annular and circular in cross-section, is disposed in the groove 36 and assists in serving to resiliently support, hold or stabilize the positions of the knives which have their lower ends bearing on said means. The means 53 is preferably made of nylon although any material suitable for the purpose may be used. The cross-dimension of the means 53 is preferably somewhat greater than the depth of the groove so that it will be compressed, partially flattened, or distorted by the knives as depicted in FIGURE 8 when the fastening means 30 are tightened.

The upper ring 36 substantially corresponds to the lower ring 25 except that it is not provided with an annular groove like 36 or with resiliently flexible means like 53. The upper ring, however, is provided with an inner cylindrical surface 54 and an outer cylindrical surface 55 which respectively correspond to the surfaces 32 and 32' of the lower ring, the surface 54 defining an opening having a diameter substantially equal to the diameter of the opening defined by the surface 32. The upper ring has a portion 56, similar to the portion 33, which is provided with circumferentially spaced radially extending notches 57 which substantially correspond to the notches 39 and form seats which receive the upper ends of the knives. It is to be understood, that if desired, a groove and resiliently flexible means could be provided in either or both of the rings or plates 25 and 26.

The upper abutment means 29 substantially corresponds to the lower abutment means 28 and is detachably secured to the upper ring by screws 58 so that the abutment means will surround the upper ends of knives and thereby prevent their outward movement and at the same time locate the inner narrow surfaces of the knives in a predetermined relation to the inner cylindrical surface 54 and radial distances with respect to the center C.

The means 30, above referred to, are preferably utilized to detachably secure the rings 25 and 26 together for holding the knives axially therebetween. More specifically, each of the fastening means includes a cylindrical member 59 and a pair of corresponding screws 60. The members 59 extend through axially aligned apertures 61 respectively in the rings and the screws 60 engage threaded holes 62 in the ends of the members and overlie an upper surface 73 of the upper ring and the lower surface 31 of the lower ring. The length of the members 59 is predetermined with reference to the length of the knives 27 and size of the resiliently flexible means 53 so that when the screws 60 are turned tightly the ends of the knives will be firmly anchored in place.

Any means suitable for the purpose may be employed to connect the cutter assembly to the rest 16 of the spider-like mounting of the support 3 but as shown in FIGURES 1 and 2, this is preferably achieved by the screws 22, above referred to.

Figures 9, 12:
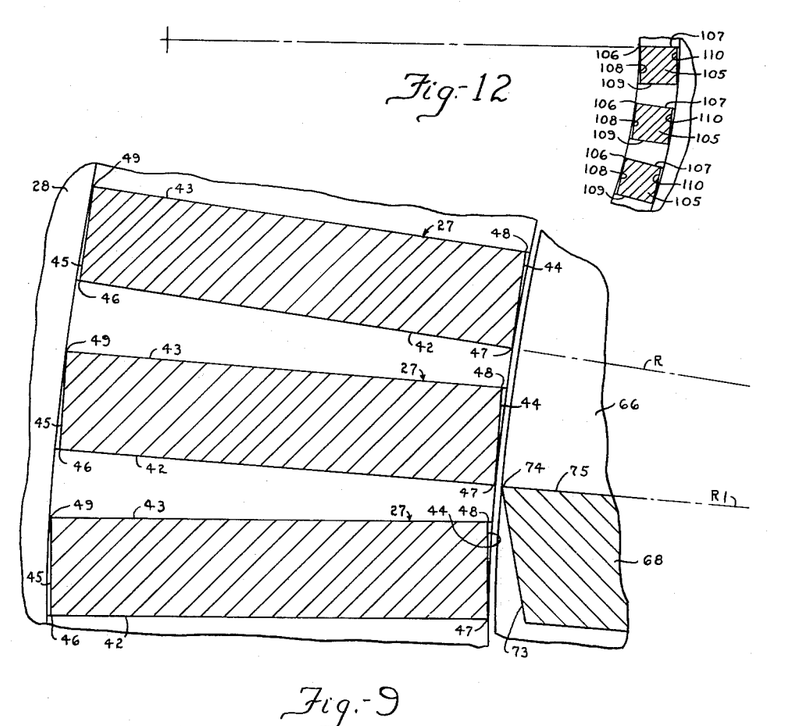
FIGURE 9 is a diagrammatic view exemplifying the geometric arrangement of the knives and vanes of the impeller.
FIGURES 11 and 12 are partial diagrammatic views of modified knife structures and arrangements thereof.

As exemplified in FIGURES 3 and 9, the knives are preferably locked in place so that their large planar surfaces 42 are radially disposed or aligned with the radii R. The surfaces 42 constitute impact surfaces against which the product is centrifically thrown by an impeller generally designated 64. The cutting edges 47 of the knives are uniformly spaced circumferentially about the axis or center C and the inner narrow surfaces 44 are disposed tangent to a circle generally defined by the edges 47 and assist in directing the product against such edges.

The cutting head may also be described as being made up of many flat shaving knives or plates, having a rectangular cross-section, arranged uniformly in the shape of a cylinder with one of the narrow faces of the rectangles facing toward the center and with the leading side or wide faces 42 of the rectangles being disposed on an approximate extension of the radius of the cylinder. This arrangement causes each of the inner narrow faces 44 of the knives to be approximately tangent to the inside of the cylinder at the leading edge of each knife. The inner narrow faces are guiding surfaces for the product and the leading edges 47 are the cutting or shaving edges as previously alluded to.

The cutter assembly and knives are so constituted that if, for example, one or more of the cutting edges 47 become worn or damaged, one or more of the knives may be removed by merely loosening the fastening means 30 so that the knives can be removed and reinstalled to locate any one of the other three cutting edges 46, 48 or 49 in a position previously occupied by the edge 47, whereupon the fastening means 30 is retightened to clamp the knives in place. With this unique organization or reversibility setup any one of four cutting edges may be selectively employed or new knives may be substituted for any which are beyond repair.

Figures 10, 11:
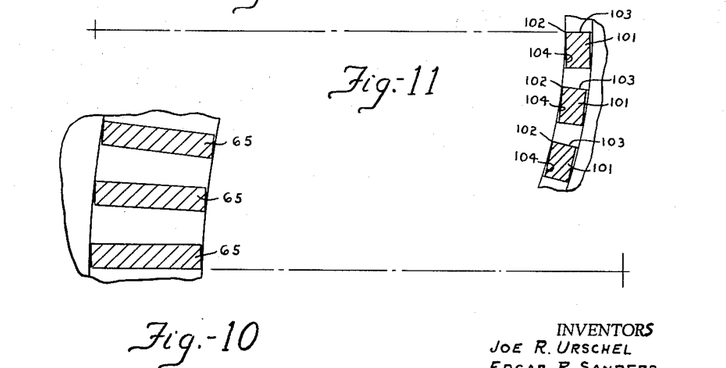
FIGURE 10 is a partial diagrammatic view of a modified knife arrangement.

As depicted in FIGURE 10 of the drawing a cutter assembly may be provided with seats which are spaced apart a greater circumferential extent than the seats shown in FIGURE 9, in which event, knives 65 secured against the seats will shave or cut the product into somewhat larger pieces or segments. Obviously, all or any desired number of the knives 27 can be utilized. For example, every other knife can be omitted in which case the number for use will be reduced to one-half of the total.

The impeller 64, above referred to, is adapted for disposition and rotation substantially within the confines of the cutter assembly in an opening defined by the inner cylindrical surfaces 32 and 54 of the lower and upper rings 24 and 25 and the inner surfaces or edges of the knives 27.

The impeller may be designed and constructed and mounted in various ways. As illustrated, it has an axial length substantially corresponding to the length of the cylindrical arrangement of the knives and preferably comprises an annular bottom solid plate 66, a top plate or ring 67 and a plurality of circumferentially spaced blades or vanes 68, which have their ends welded at 69 to opposed planar surfaces of the plates. The top plate 67 is preferably bevelled or chamfered at its periphery as indicated at 70 and provided with a relatively large center opening 71 through which the product to be shaved or cut is fed from an overhead supply. The bottom plate 66 is also preferably bevelled or chamfered at 72. The purpose of the bevels or chamfers 70 and 72 is to substantially eliminate, relieve or prevent packing of the product to reduce friction while it is being shaved or cut. If desired, the clamping plates or rings 25 and 26 may be provided with bevels or chamfers for such purpose. It will be noted that the inner edges of the blades 68 are disposed flush with the marginal edge defining the opening 71 and that the outer portions of the blades are bevelled at 73 to afford relief and define sharp longitudinally extending edges 74, which edges are all equally spaced from the center axis C and flush with the peripheries of the plates. The impeller is provided with seven blades, as shown, and the blades are preferably affixed to the plates in a manner whereby each blade is provided with a relatively large planar propelling surface 75 disposed radially in alignment with a radius R1 and the surface 42 of each of the knives as the impeller rotates. It is to be understood that the impeller may be provided with any number of blades desired, the number used being dependent, at least to some extent, on the particular kind of product that is to be shaved or cut.

Attention is directed to the fact that the angle of the impelling or propelling faces or surfaces 75 of the impeller blades is important. If these leading faces were moved forward to lift the product from the shaving knives it would reduce the capacity of the mill. If the outermost faces were moved backward with respect to the innermost faces, an acute angle would be formed between the impelling faces and the inner surface of the cutting head which would tend to crush the product and thereby defeat the purpose of the mill. Although there may be some divergence from a radial face 75 on the blades, any great amount of divergence is not desirable.

Of further significance is the fact that if the impeller were constructed so that the leading surfaces on the impeller blades formed a circle coinciding with the outer edge of the circular end rings, excessive friction would result because small particles of the product would momentarily find their way between the ends of the impeller blades and the guiding surfaces of the shaving knives. Therefore, the leading surfaces of the impeller blades are relieved at 73 as behind the impelling faces to gradually increase the clearance between the impeller blades and the knives. The edges 74 of the blades or the impeller are preferably spaced a predetermined distance from the cutting edges 47 of the knives so as to obtain a shaving or shearing cut without mashing, crushing or grinding of the product. A clearance of .003" has proven satisfactory under some conditions of operation. It is desirable that the clearance between the outermost edges 74 of the blades and the innermost edges 47 of the knives be the smallest practical running clearance so as to prevent the product from rolling under the said edges of the blades which would tend to crush the product and defeat the purpose of the mill. The impeller may be rotated at any speed desired, preferably within a range between 1800 r.p.m. and 20,000 r.p.m. which has proven satisfactory for the majority of products.

The impeller may be operatively connected to the drive shaft 6 in various ways. As shown in FIGURE 2, the shaft 6 is provided with an annular enlargement 76 having an upper planar surface 77. This enlargement is preferably provided with a center internally threaded boss 78 and a plurality of holes 79. The bottom plate 66 of the impeller is provided with an aperture 80 which receives the boss 78 and a threaded stud extends through the aperture into the boss, with a washer 81 held against the plate by a nut 82. Dowel driving pins 83 are secured in the holes 79 and also in matching holes 84 provided in the lower side of the plate 66. It will be noted that the height of the boss is slightly less than the thickness of the plate 66 so as to obtain an efficient clamping of the bottom plate in relation to the enlargement of the shaft. A cylindrical extension 85 of the portion 14 of the mounting surrounds the driven shaft and is provided with an annular groove 86 interrupting its upper surface and an annular bead 87 on the enlargement 76 is disposed in this groove, the purpose of which is to assist in preventing entry of any minute portions of a product from finding their way downwardly along the drive shaft.

As depicted in FIGURE 2, a tubular fitting 88 is preferably detachably connected to the upper ring 26 of the cutter assembly by a plurality of screws 89 which extend through apertures in a plurality of circumferentially spaced radially extending lugs 90 of the fitting into threaded holes provided in the ring. It will be observed that the underside of each of the lugs 90 is recessed to provide a rabbet 91 for receiving a portion of the ring to assist in centering the fitting and so that a depending portion 92 of the fitting will be received in the opening 71 provided in the top plate 67 of the impeller. It will be observed that the depending portion 92 and a portion of the fitting above the flange 90 is tapered inwardly and that the fitting includes a socket or sleeve portion 92 which receives a reduced cylindrical portion 94 of a funnel 95. The funnel is preferably provided with a curved lip 97 which is adapted to receive and rest upon an inner annular marginal portion 98 of a cylindrical guide 99 mounted on the tapered guide 8 and detachably connected thereto by clips 100. The guide 99 serves to limit outward flow of some of the shaved product and direct the product downwardly into a receptacle or container, not shown.

Referring now to the operation of the machine, when a product enters the impeller, it is first met by the innermost ends of the impelling faces of the blades. The product then slides outwardly along the impelling faces until its outward movement is stopped by the shaving knives. If the knives were not present and the product were permitted to fly freely off the ends of the impelling faces, the product would fly off in a straight line that would form an angle between a radial line and a tangential line. With the knives or blocks in place, if their trailing edges were moved outward or if the exit space between the knives were too large, then particles larger than desirable would be produced. Therefore, the guiding faces of the knives should not be greater than a tangent to the leading edges. Also, for any number of knives used in a cylinder, the thickness of the knives must be such that the exit space between them will be large enough to permit exit of the shavings and small enough to prohibit the exit of particles larger than required. The condition described is a momentary condition which occurs only at the time the product first enters the impeller and the product first meets the knives at it slides outward on the impelling faces of the impeller. Therefore any substantial change from a tangential inner face on the shaving plates is not desirable.

Attention is directed to the fact that when any object is revolved in a circular path and then is released from that circular path, the free flight of the product will describe a straight line tangent to the circle at the point of release from the circular path. When a product is revolved inside the cutting head by the impelling blades, shavings are removed from the product by the leading edges of the shaving plates and as the product leaves this leading edge, it moves out freely on a tangent to the leading edge of the next shaving plate. If the trailing edges of the knives were moved inward, the product would no longer move in free flight but would pressed against the surface 44 of the knives and much friction and heat would be generated. This is not desirable. In other words, for the machine to operate most efficiently and produce uniform size of pieces, the inner surfaces of the knives or blocks should be tangent to the cutting edges. The thickness of the shavings produced is controlled entirely by the number of knives in a cutting head for any fixed diameter of cutting head. The greater the number of knives in a cutting head, the less distance the product will move on a tangent between leading edges of the knives and therefore the thinner will be the shaving. When this mill is operated at lower impeller speeds, the shavings produced may remain intact, but when operated at high speeds, the high speed of forming the shaving may cause it to break up into smaller pieces. When a product such as rice is shaved with the mill, microscopic examination determines that many curled shavings are produced at lower speeds and that these are broken into smaller pieces at the higher speeds.

In view of the foregoing, it should be manifest that the structural characteristics and relative positions of the cutting edges 47 and radial and tangential surfaces 42 and 44 on the knives 27 and that the edges 74 and radial and oblique surfaces 75 and 73 of the blades 68 are all predetermined to obtain an efficient shaving or cutting action on a variety of products, including and not by way of limitation, rice, coffee beans, peanuts, apples and nutmeg.

It is to be understood, that in some instances the structural characteristics and arrangement of the knives may be modified. For example, as exemplified in FIGURE 11 of the drawing, knives 101 of a cutter assembly may be constructed so that their circumferential cross-sectional dimension is greater than their radial dimension as distinguished from the knives 27 and 65 above referred to. Each of the knives 101 is provided with a plurality of cutting edges, including a cutting edge 102, a radial surface 103 and a tangential surface 104.

As illustrated in FIGURE 12 knives 105 of a cutter assembly are shown as having a substantially square cross-section. The knives 105 are each respectively provided with a cutting edge 106, a radial surface 107 and tangential surface 108, which are similar to those above described. The area of surfaces 106 and 107 and surfaces 109 and 110 respectively opposite the surfaces 107 and 108 of each knife substantially correspond.

Moreover, it should be evident that in some installations the knives could have a greater radial dimension than an axial dimension and that they could also be cubical.

Figure 13:
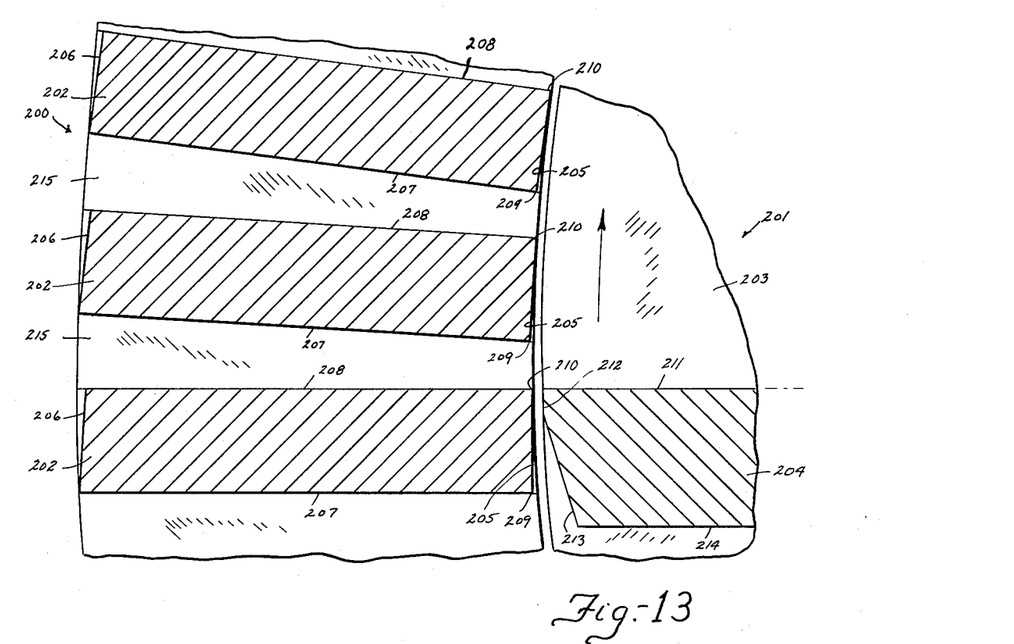
FIGURE 13 is an enlarged partial view of a modified assembly illustrating in detail the operative relation between an impeller blade and one of a plurality of circumferentially spaced abutments or blades of a cylinder or annulus.
Figure 14:
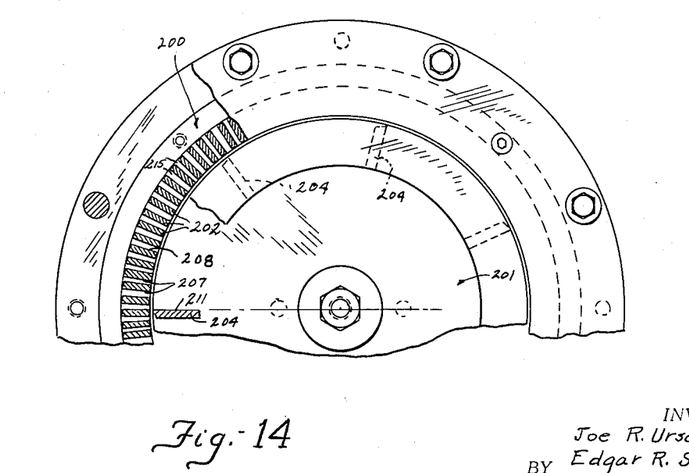
FIGURE 14 is a partial plan view showing more of the assembly than that depicted in FIGURE 13.

Referring now to the disclosure in FIGURES 13 and 14, an object is to provide a machine or mill which is primarily designed and constructed for reducing the size of a solid material in a fluid or for reducing the size of any material which can be discharged from the mill as a fluid. The machine preferably includes a stationary cylinder, annular assembly or formation generally designated 200 and an impeller 201. The cylinder or assembly is fabricated in a manner substantially corresponding to the cutter assembly above referred to and includes a plurality of circumferentially spaced corresponding blocks, members or abutments 202 and the impeller preferably includes a head 203 provided with a plurality of circumferentially spaced blades 204.

More particularly, each of the blocks or members 202 of the cylinder or annular assembly is preferably elongate, rectangular in cross-section and provided with an inner planar impact surface 205, an outer planar surface 206 parallel to the inner surface, a side planar surface 207 and a side planar surface 208 parallel to the surface 207. The inner impact surface and parallel side surfaces define an elongate leading edge or arris 209 and an elongate trailing edge or arris 210. The blocks or members are reversible so that if desired, the outer surfaces 206 may be substituted for the impact surfaces 205.

Attention is directed to the important fact that the inner impact surfaces are disposed tangent to the cylinder or annulus at their trailing edges, as distinguished from being tangent to their leading edges as described above in connection with the disclosure in FIGURE 9. Attention is further directed to the fact that the impeller is adapted to be rotated at tremendous speeds and that each blade of the impeller has a radial planar surface 211 constituting an abutment for rotating the product and directing it against the blocks and outwardly and through the cylinder by centrifugal force. Each of the impeller blades also includes an outer planar peripheral edge or tip 212, a clearance surface 213, adjacent to the edge 212, and trailing planar surface 214 parallel to the radial surface 211.

With respect to the operation of the machine structure exemplified in FIGURES 13 and 14, several factors cause the product to be reduced in size. More specifically in this respect, as the edges or tips 212 of the impeller blades over the inner impact surface 205 of each block, the clearance between the tip of any impeller blade and impact surfaces decreases. This causes the product to be crushed or disintegrated, as distinguished from being cut.

Also, as the product passes over the impact surfaces 205 of the blocks, the surfaces reactively push the product inwardly and then release it after passing over the trailing edges of the blocks for outward movement by centrifugal force through a plurality of circumferentially spaced radially extending divergent passages 215 defined by the adjacent opposed planar side surfaces of the blocks. This inward and outward action or movement of the product takes place at several thousand actions per second and this causes destruction or disintegration of the product through tremendous impact pressures.

Furthermore, any solid product with the fluid flows over the inner surface of the cylinder at many thousands of feet per minute and, as the solid product and fluid escape from the cylinder through the passages 215 they must turn at a right angle at high speeds to flow through the passages. This causes a tremendous ripping, disintegrating or breaking action of the solid portions of the product to be conditioned. The spacing or discharge passages between the blocks can be controlled so as to permit the escape of the particles only after they have been reduced to a certain or predetermined size.

As an example, to show the relation between the number of blocks and spacing therebetween, a cylinder or annular assembly having a 6″ inside diameter with a .084″ thickness of blades may be fabricated as follows:

| Number of blocks 202 in cylinder: | Space 215 between blocks for escape of product |
|---|---|
| 140 | .0506 |
| 160 | .308 |
| 180 | .0207 |
| 200 | .0103 |
| 212 | .0049 |
| 222 | .00091 |

The following additional technical data is also submitted to show the operative relationship between the speed of the impeller, the surface speed in feet per minute, centrifugal force applied to the product, and the inward and outward movement of the product in the number of actions per second when, for example, a cylinder having an inside diameter of 6″ and 200 blocks is employed:

| Impeller speed in revolutions per minute | Surface speed in feet per minute | Centrifugal force on product (multiply weight of product by following figures) | Inward and outward movement of product in number of actions per second |
|---|---|---|---|
| 3,600 | 5,655 | 1,105 | 12,000 |
| 6,480 | 10,179 | 3,580 | 21,600 |
| 9,540 | 14,985 | 7,758 | 31,800 |
| 11,925 | 18,732 | 12,123 | 39,750 |
| 14,000 | 21,991 | 16,709 | 46,666 |

Moreover, as to the use of the machine or mill on various products such as, for example, on tomato catsup, the solid particles in the catsup are broken down into small size particles which in turn gives more area to cover and thereby increases the viscosity of the catsup. Also, catsup of equal viscosity can be made by using less than a normal amount of tomatoes. Catsup is preferably milled or conditioned in the subject machine at a rate, for example, of 30 gallons per minute when a cylinder composed of 200 blocks with an impeller speed of 9,540 r.p.m. is employed. If the speed is reduced below this figure, the fiber will build up inside of the cylinder to prevent release of the product as well as cause overloading of the motor.

The machine is also utilized to condition very finely ground salad mustard having a high viscosity through the use of a cylinder, for example, containing 212 blocks and an impeller revolving at 9,540 r.p.m. Slightly finer grinding can be obtained at a speed of 11,925 r.p.m.

Also, observable seed specks in bananas can be eliminated with a cylinder having 222 blocks and an impeller operating at a speed of 9,540 r.p.m. and a smooth cranberry jell can be produced by the use of a cylinder having 200 blocks with an impeller operating at 9,540 r.p.m.

Considerable power is required to drive fluid through the mill and as the impeller speeds increase, through-put decreases for the same or equivalent power employed. It is believed that a practical limit on speed is reached at approximately 12,000 r.p.m. Speeds as low as 6,000 r.p.m. do not appear to be useful on any product due to the accumulation of solid portions of the product inside the cylinder.

Machines or mills could be used which have internal diameters greater or lesser than six inches. However, the operating data given above cannot be directly interpolated to mills of other diameters because all factors do not change in direct proportion to changes in the diameter. Destruction by impact varies with the square of the speed and centrifugal force varies with the square of the speed and inversely with the radius of gyration.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. An assembly comprising a pair of rings respectively provided with a plurality of circumferentially spaced seats, a plurality of axially extending circumrenetially spaced knives having end portions disposed in said seats and spacing said rings apart in parallel relation, said knives being provided with inner longitudinally extending cutting edges disposed substantially parallel to the longitudinal axis of said assembly, means for locking said knives in place, and resilient means engaging at least some of the end portions of said knives whereby to restrain movement thereof relative to said seats.

2. An assembly comprising a pair of separate annular rings, a plurality of circumferentially spaced members secured axially between said rings and defining discharge openings, each of said members having a large substantially radially disposed surface and an inner smaller impact surface intersecting said large surface to define a trailing edge, with said edges substantially forming a cylindrical structure and said impact surfaces being substantially tangent to said structure at said trailing edges and impeller means for directing a product against said impact surfaces and release from said trailing edges through said discharge openings.

3. A supporting structure provided with a plurality of circumferentially spaced axially extending knives defining discharge openings therebetween, each of said knives being provided with an inner longitudinal cutting edge generally constituting a line of a cylinder, each of said knives also being provided with an inner surface which is disposed substantially tangent to said cylinder, means carried by said supporting structure and separate from said knives for clamping the knives in place, and impeller means for directing a product against said inner surfaces and release through said discharge openings.

4. A supporting structure provided with a plurality of circumferentially spaced axially extending members defining discharge openings therebetween, each of said members being provided with an inner longitudinal trailing edge generally constituting a line of a cylinder, each of said members also being provided with an inner impact surface which is disposed substantially tangent to said cylinder at said trailing edge, and impeller means for directing a product against said impact surfaces and release from said trailing edges through said discharge openings.

5. A support, a structure stationarily mounted on said support and provided with a plurality of at least 90 circumferentially spaced axially extending knives, each of said knives having a planar substantially radially extending surface and an inner surface disposed substantially tangent to said radial surface to define a longitudinal cutting edge, and an impeller rotatably mounted substantially within the confines of said stationary structure for receiving a product to be cut and provided with less than 10 circumferentially spaced blades having substantially radial surfaces for rotating the product to said cutting edges.

6. A support, a structure stationarily mounted on said support and provided with a plurality of circumferentially spaced axially extending members defining discharge opens, each of said members having a planar substantially radially extending surface and an inner impact surface disposed substantially perpendicular to said radial surface to define a longitudinal trailing edge whereby said edges define a cylinder and said impact surfaces are tangent to the cylinder at said edges, and an impeller rotatably mounted substantially within the confines of said stationary structure and provided with circumferentially spaced blades having substantially radial surfaces for rotating the product against said impact surfaces for disintegrating the product and releasing the same from said trailing edges for passage through said discharge openings.

7. A support, a structure stationarily mounted on said support and provided with a plurality of circumferentially spaced axially extending members, each of said members having a substantially planar radially extending rear surface, a front surface parallel to said rear surface and an inner impact surface disposed transverse with reference to said rear and front surfaces to define a trailing edge and a leading edge, and an impeller structure rotatably mounted substantially within the confines of said stationary structure and provided with circumferentially spaced blades having radial surfaces and edge portions disposed for rotation with respect to said impact surfaces, said edge portions of said impeller structure being disposed for closer rotation with respect to said trailing edges than the leading edges of said members.

8. A supporting assembly provided with a plurality of circumferentially spaced axially extending plates defining a substantially cylindrical tubular structure, each of said plates having a trailing edge and an adjacent inner impact surface which is disposed tangent to said structure at said edge, and impeller means rotatable in said structure for causing a product introduced to said structure to be gradually compressed against said impact surfaces to effect disintegration of the product prior to its outward release between the plates.

9. A plurality of closely spaced circumferentially spaced members defining a substantially cylindrical structure, each of said members being provided with an impact surface and a pair of side surfaces intersecting said impact surface to define an elongate leading edge and an elongate trailing edge, and each of said impact surfaces being disposed tangentially with respect to said structure at the trailing edge, and means for mounting the structure in a stationary position.

10. The cylindrical structure defined in claim 9 including an impeller mounted within the confines of said structure and provided with circumferentially spaced blades for driving a product against the impact surfaces for effecting its disintegration.

11. An assembly comprising a pair of rings respectively provided with a plurality of circumferentially spaced seats, a plurality of axially extending circumferentially spaced knives having end portions disposed in said seats and spacing said rings apart in parallel relation, said knives being provided with inner longitudinally extending cutting edges disposed substantially parallel to the longitudinal axis of said assembly, means for locking said knives in place, an annular groove provided in one of said rings, and annular resilient means disposed in said groove and engaging at least some of the end portions of said knives whereby to restrain movement thereof relative to said seats when said knives are locked in place.

12. An assembly comprising a pair of annular rings, a plurality of circumferentially spaced knives secured axially between said rings, each of said knives having a large substantially radially disposed surface and an inner smaller surface intersecting said large surface to define a cutting edge, with said edges substantially forming a cylindrical cutting structure and said smaller surfaces being resppectively substantially tangent to said structure at said cutting edges.

13. An annular structure provided with a plurality of circumferentially spaced axially extending knives, and each of said knives having a substantially planar radially extending surface and an inner surface disposed substantially perpendicular to said radial surface to form a cutting edge, the cutting edges defining a circle with said inner surfaces extending tangentially from said edges.

14. A method of comminuting a product which comprises rotating the product about a vertical axis and guiding it outwardly therefrom on radial planar surfaces for engagement with fixed tangentially disposed surfaces, directing said product along said tangential surfaces and into engagement with adjacent circumferentially spaced vertical comminuting edges disposed substantially equidistant from said axis to comminute the product, and then directing the comminuted product outwardly between and on closely spaced radially disposed surfaces.

15. A method of reducing the size of a product by shaving it against knife edges which comprises rotating the product inside a cylinder which is made up of a plurality of knives having a rectangular cross section, with the leading edge of each knife forming a cutting edge, with the inner surfaces of each knife forming a tangent from each cutting edge, permitting free flight from one cutting edge to the next on a tangent to the cutting edge, cutting the product by the knife edges and discharging the cut product along surfaces which are radial to the knife edges.

16. A method of reducing the size of a product by shaving it against knife edges which comprises rotating the product against knife edges, with the knives being of rectangular cross section, with the knife edges forming the shape of a cylinder, with the knife edges parallel to the axis of the cylinder, with the inner faces of the knives forming tangents to the knife edges in the direction of rotation, cutting the product with the knife edges, and directing the cut material outwardly along radial faces of the knives.

17. An assembly comprising a pair of annular rings, a plurality of circumferentially spaced knives secured axially between said rings, each of said knives having a large radially disposed surface and an inner smaller surface intersecting said large surface to define a leading cutting edge, with said edges substantially forming a cylindrical cutting structure and said smaller surfaces being substantially tangent to said structure at said edges, and means clamping said rings to fixedly secure said knives therebetween.

18. In combination: a pair of annular rings provided with a plurality of circumferentially spaced seats, a plurality of knives having ends disposed on said seats, and means engaging and resiliently supporting at least certain of the ends of said knives with respect to at least one of said rings.

19. An assembly for use in reducing the size of a product, said assembly comprising a pair of annular rings, a plurality of circumferentially spaced members secured axially between said rings, each of said members having a substantially radially disposed surface and an inner surface and an inner surface intersecting said radially extending surface to define a longitudinal edge, with said inner surfaces and said edges substantially forming a cylindrical reducing structure and said inner surfaces being respectively substantially tangent to said structure.

20. An annular supporting structure for use in reducing the size of a product, said structure including a plurality of circumferentially spaced axially extending members, and each of said members having a substantially planar radially extending surface and an inner surface disposed transverse to said radially extending surface to define a longitudinal edge, the edges defining a circle with said inner surfaces extending substantially tangentially from said edges.

21. A method of reducing the size of a product which comprises rotating the product about a longitudinal axis and guiding it outwardly therefrom on radial planar surfaces for engagement with fixed tangentially disposed surfaces having trailing edges disposed substantially equidistant from said axis, forcibly directing said product against said tangential surfaces for crushing the same, and then releasing the crushed product outwardly from said trailing edges on radially disposed surfaces which are spaced from said edges.

22. A method of reducing the size of a product which comprises rotating the product inside a cylinder which is made of a plurality of members having a rectangular cross section and leading and trailing edges with an inner impact surface between said edges forming a tangent from each trailing edge, forcibly directing the product against said impact surfaces to crush the same, permitting flight of the crushed product from said trailing edges to said leading edges, and then discharging the crushed product along surfaces which are radial to said leading edges.

23. A method of reducing the size of a product which comprises rotating the product about a longitudinal axis and guiding it outwardly therefrom on radial planar surfaces for engagement with fixed tangentially disposed surfaces having leading and trailing edges respectively disposed substantially equidistances from said axis, forcibly directing said product against said tangential surfaces and said edges for reducing the size of the product into particles, and then releasing the particles outwardly from said trailing edges on radially disposed surfaces which are spaced from said edges.

24. The structure defined in claim 20, in which the structure comprises at least 90 members and the diameter of the circle is at least four inches.

25. The method defined in claim 22, in which the product is directed against the impact surfaces at a rate of approximately 25,000 times per second.

References Cited by the Examiner
UNITED STATES PATENTS

| | | | |
|---|---|---|---|
| 326,853 | 9/1885 | Cormack | 241—95 X |
| 467,247 | 1/1892 | Engle | 241—95 |
| 1,459,790 | 6/1923 | Nevius | 241—95 |
| 2,345,779 | 4/1944 | Wagner | 146—239 |
| 2,628,081 | 2/1953 | Laird | 259—96 |
| 2,656,988 | 10/1953 | Smith | 241—275 |
| 2,798,674 | 7/1957 | Denning | 241—275 X |
| 2,874,909 | 2/1959 | Pallmann | 146—90 X |
| 2,920,830 | 1/1960 | Nyrop et al. | |
| 3,004,573 | 10/1961 | Cover | 146—239 |

ROBERT C. RIORDON, *Primary Examiner.*

J. SPENCER OVERHOLSER, WILLIE G. ABERCROMBIE, *Examiners.*